WILLIAM F. HABERMANN
ROBERT M. HENDERSON
INVENTOR.

WILLIAM F. HABERMANN
ROBERT M. HENDERSON
INVENTOR.

United States Patent Office 3,538,069
Patented Nov. 3, 1970

3,538,069
CONTINUOUS PROCESS FOR CONCENTRATING PROTEIN COMPRISING TREATING THE PROTEIN WITH A HEATED GAS FOLLOWED BY REMOVING SOLUBLES FROM THE PROTEIN BY MIXING WITH SOLVENT
Robert M. Henderson, Dalton, and William F. Habermann, Pittsfield, Mass., assignors to Beloit Corporation, Beloit, Wis., a corporation of Delaware
Continuation-in-part of application Ser. No. 815,980, Apr. 14, 1969, which is a continuation-in-part of application Ser. No. 656,742, July 28, 1967. This application June 9, 1969, Ser. No. 831,663
Int. Cl. A23j 1/00
U.S. Cl. 260—112       7 Claims

ABSTRACT OF THE DISCLOSURE

The invention relates to a process for removing soluble materials from substances containing protein. The process consists of first contacting the protein with a heated gas for sufficient time to sufficiently reduce the volatile material therein. Then the protein is mixed with a first solvent, having been recycled, and then they are separated. Next the protein is mixed with a quantity of second solvent, the second solvent having been obtained from the next succeeding zone, and then the protein is removed from the second solvent. In the Nth zone, where N is an integer of at least one, the second solvent is fresh solvent.

BACKGROUND OF THE INVENTION

This application is a continuation-in-part of U.S. Ser. No. 815,980, filed Apr. 14, 1969, which in turn is a continuation-in-part of U.S. Ser. No. 656,742, filed July 28, 1967 and now abandoned. The use of liquids or solvents to extract soluble material from insoluble substances has long been practiced in a wide variety of industries. Such a practice permits essentially complete separation of the materials with relative ease. As first conceived, this method consisted merely of forming a slurry of the substance containing the soluble material in the solvent. After a predetermined length of time, the insoluble substance was then separated from the solvent and the soluble material was recovered from the solvent by various means such as distillation, precipitation and the like. However, such batch processes required large vessels and separating devices, thereby incurring substantial capital expense, and were not particularly efficient in extracting the last available portion of the soluble material from the substance. This is true normally because the solvent becomes less effective in dissolving the soluble material as the concentration of the soluble material in the solvent increases. Thus large volumes of solvent were needed to obtain relatively complete separation.

It was later proposed to operate this extraction process in a continuous manner, whereby a series of mixing and separating devices were connected together. As a further improvement, it was then discovered that improved efficiencies could be obtained if the solvent extracted from the final stage would be passed back to the next preceding stage and so on since the amount of soluble material remaining in the substance decreased as the substance was passed from each system on to the next. In this manner, the purest solvent, containing the least amount of dissolved material, contacted the purest substance being treated and therefore the capacity of the solvent to extract the soluble material was utilized most efficiently.

One industry in which this method of passing the solvent back has been found to have achieved great acceptance is the food industry. A particular example, which is set forth to demonstrate the techniques of the present invention is the production of protein concentrate. In this instance, the protein is contained in a raw food material such as fish, meat and meat offal, soya beans and other legumes such as peas, beans, etc., cotton seed, sunflower seeds, grape seeds, brewers grain, poultry and poultry offal and the like. A substantial portion of any of these edible products is protein and, as the world has been more conscious of the value of protein, greater efforts have been made to concentrate the protein by eliminating the other components of the food.

In the various attempts of elimination of these other components, it has been found that a solvent system is not completely suitable, in that oftentimes these solvent systems solubilizes or otherwise materially affect the protein itself. Many of the undesirable components of protein containing matter have the ability to solubilize a portion of the protein itself, and in more instances the solvent itself acts adversely on the protein. Sometimes it is merely an excess amount of solvent which causes solubilization of the protein, thereby lessening the efficiency of the recovery process.

In many instances both oil and water are present in the raw protein source. While the solvent may be efficient in the removal of the oil, the presence of water adversely effects the solvent activity by formation of inverted emulsions and other phenomenon. In other systems, the protein portion is more soluble in the more volatile fluids present in the meat, fish, offal or whatever.

OBJECTS OF THE INVENTION

It is therefore an object of this invention to provide a process for separating protein from soluble substances contained in foods by the use of a solvent for the soluble portion such as fats and oils.

It is another object of this invention to materially reduce the volatile material therein prior to solvent action on the soluble portions of the food.

Other objects will become apparent from a reading of the following description and claims.

THE DISCOVERY

It has now been discovered that the above and other objects of this invention may be achieved in the following manner. Basically, the invention comprises a process for removing soluble materials from protein containing substances wherein the substance is first subjected to an initial volatilization to remove volatile material or a portion of the volatile material followed by passage through a series of zones. Any number of zones may be employed, depending upon the desired purity and the particular solvents and food protein sources, and for that reason the number of zones employed is defined as being the letter N, where N is an integer of at least one. Most often, satisfactory separation of the protein from the soluble materials can be effected in two or three zones, although as set forth above, any number of zones may be employed.

A wide variety of protein containing materials may be processed according to the present invention such as: whole fish or frozen fish, meat and meat offal, brewers grain, distillers grain, soya beans, malt grains, poultry and poultry offal, cotton seed, sunflower seeds, and other seed types, soya beans and other legumes, such as peas, beans, and the like.

A number of solvents may be employed to remove the oils, fats, sugars, starches, and other undesirable portions of the natural food product from the protein to yield a protein concentrate. For example, water, isopropyl alcohol, ethyl alcohol, methyl alcohol, acetone, amyl acetate, ethyl acetate, hexane, t-butyl alcohol, trichloroethylene, methyl-ethyl ketone, and many of the common commercial solvents. Of course, mixtures of two or more solvents are sometimes quite effective in removal of soluble materials from protein containing foods and are to be considered as falling within the use of the word solvents as employed herein.

The particular steps of the present invention consist of introducing the protein containing material into a stream of heated gas for sufficient time to reduce the volatile material contained therein, such as water, light oils, and the like. Such a procedure is known generally as "flash drying" and is normally carried out by inserting the material being treated into a stream of hot air which has been generated from the heat source. The hot air carries the particle being treated through a passage. Adjustment of the length of time of passage, the temperature of the air and other variables will adequately regulate the amount of volatile material removed. In most instances, it is desirable to remove at least 50% of the volatile material contained in the raw food product. In a more preferred embodiment, 80% or more of the volatile material should be removed. By the term "volatile material," it is meant those materials contained in the protein source which are capable of rapid evaporation or volatilization at temperatures below about 300° F. In most instances, a source of hot gas at temperatures ranging above 300° F. will contact the protein for a short period of time sufficient to raise the temperature of the material to a point where water and other highly volatile materials will flash off of the particle. The contact time is sufficient to volatilize the liquids, but it is not sufficient to raise the temperature of the solid material to a point where oxidation or other adverse occurrences will become a factor.

Many devices are provided for carrying out the initial step of this invention. All that is needed essentially is a source of hot gas, preferably air, and a passageway through which the air and the particles being heated may pass.

Once a substantial amount of the volatile material has been removed, the protein containing material is introduced into a series of N zones where N is an integer of at least one. This protein is introduced into the zone along with a quantity of first solvent, with the first solvent consisting of solvent which has been recycled from that particular zone. It is to be understood that this process is continuous in nature, and that after the operation has begun, solvent will be withdrawn continuously from each of the zones. A portion of the solvent which is withdrawn is recycled back and forms this first solvent. After the first solvent and the protein have entered the zone, the solvent is permitted to solubilize or otherwise leach out the soluble material from the protein. Then the protein and the first solvent are then separated in the zone. Once the protein has been separated from the first solvent, it is mixed with a quantity of second solvent, with the second solvent being obtained from the next succeeding zone. Again, once this continuous process is in operation, solvent will be continually withdrawn from the next succeeding zone. A portion of that next succeeding zone solvent will be recycled for use in that zone and the balance of the solvent will be passed back to the instant zone for use as a second solvent. Of course, in the Nth zone, the second solvent is normally fresh solvent.

In a preferred embodiment of the present invention, a centrifuge may be employed to separate the solvent containing the soluble portion of the food from the protein. Most preferred for the purposes of this invention are centrifuges known as two stage centrifuges. Examples of these two stage centrifuges are the Models E.C. 016, E.C. 03, E.C. 04, and E.C. 06 types of screening centrifuges which are manufactured in France by Robatel et Mulatier and are available from the Jones Division of Beloit Corporation in the United States.

In one embodiment of the present invention the recycled portion of the solvent is withdrawn from a point near the discharge end of the centrifuge and is returned to the zone at a point near the entrance of the centrifuge. Prior to its introduction into the centrifuge, the solvent being recycled may be mixed with the protein containing material which is being processed. In yet another embodiment of this invention, the solvent from the next succeeding zone is introduced into the instant zone at a point near the discharge end of the zone. Thus when a centrifuge is being employed, the relatively fresh solvent coming from the next succeeding zone is introduced into the latter part of the centrifuge where it mixes with and passes through the protein containing material. This solvent extracts a portion of the soluble materials contained in the foodstuff and passes through the screen. After this washing effect is achieved, the solvent is recycled back into the centrifuge entrance where it mixes with the food being introduced into the centrifuge. Again the solvent extracts additional material from the protein material and passes through the screen of the centrifuge. The solvent at this point contains additional material which has been dissolved therein, and the solvent is now available for passage back to the next preceding zone where the same cycle is practiced.

DESCRIPTION OF THE DRAWINGS

To more fully describe the present invention and its various embodiments, reference is now made to the drawings in which:

As shown in FIG. 1, a protein source contained in schematic diagram box 12 is passed along line 10 into an entrance funnel 14. The protein is then mixed with hot gas from a hot gas supply 16 in line 15 and passed through contacting chamber 18, as schematically shown by arrow 19. This protein which has been contacted with the hot gas is passed through line 20 to holding tank 22. During the transfer through line 15 and chamber 18, a substantial portion of the volatile material contained in the protein source is volatilized. In most cases, the substantial bulk of this volatile material will be water, although some portion of this will be light oils and other fluids.

Figure 1:
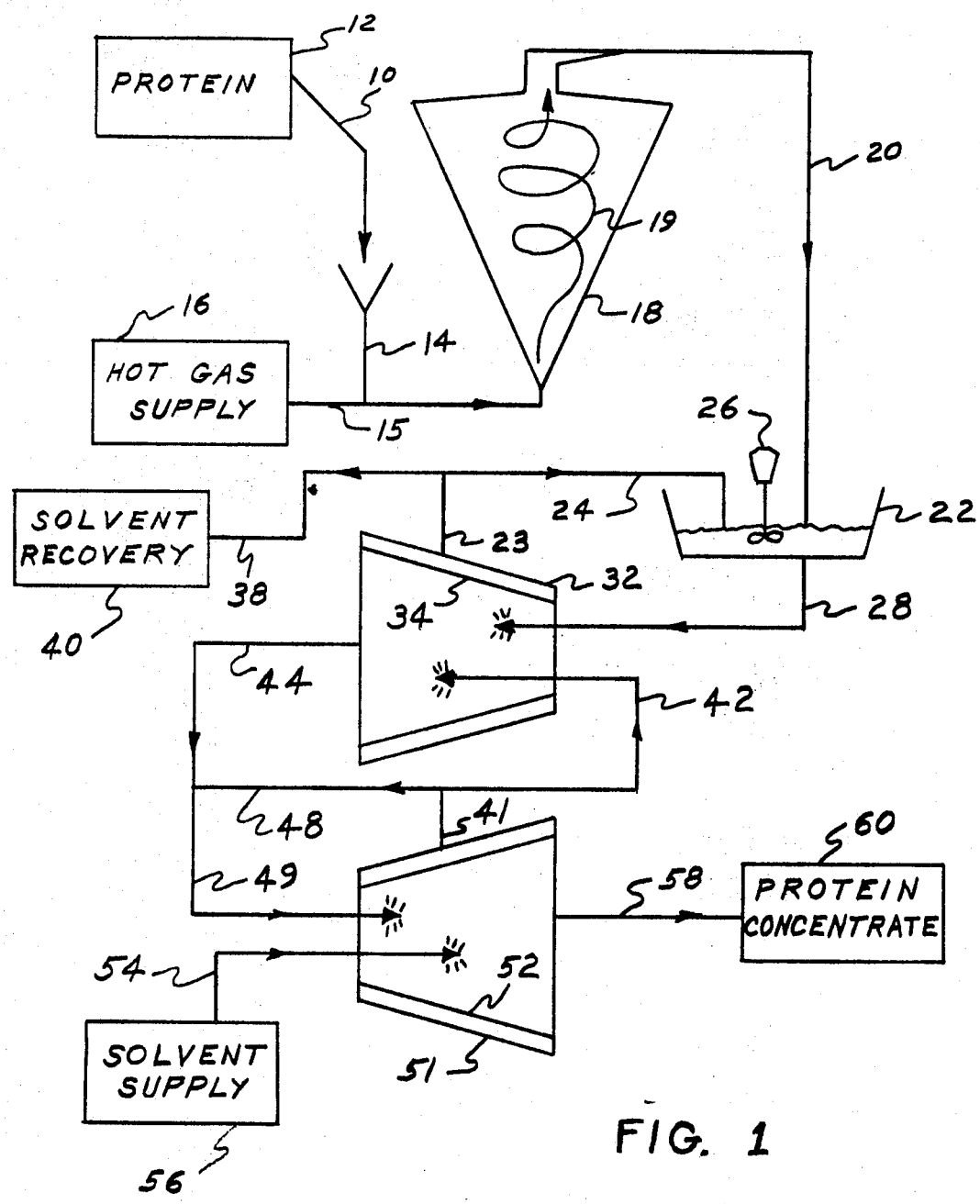
FIG. 1 is a schematic flow diagram showing the broad concepts of this invention.

As the protein which has been "flash dried" is passed to tank 22, a quantity of solvent is introduced through line 24 into the same zone and the protein and solvent are intimately mixed through mixer 26. The solvent and fish are then introduced into the first zone 32 through line 28. Introduction of the solvent from line 24 and the fish from line 20 into the zone 32 permits extraction of soluble oils, fats and other soluble portions of the protein containing material. The solvent is then separated from the protein through separating wall 34, whereby the solvent is withdrawn from the zone through line 23, such that a portion of the solvent is withdrawn from the total system through line 38 to solvent recovery unit 40 and the balance of the solvent is passed through line 24 to form the first solvent of the zone.

The protein meanwhile is passed along through the first zone 32 and is mixed with a second solvent which is introduced through line 42 and which comes from the next succeeding zone. After contact of the second solvent with the protein, this solvent is also removed from the protein through separating wall 34 and is collected for withdrawal through line 33 as described above.

The protein is then passed through line 44 to the second zone 51. Prior to introduction of the protein into the second zone 51, it is mixed with a quantity of first solvent from line 48. The solvent in line 48 is obtained from that solvent which is removed from the second zone 51 through line 41 as will be described hereinafter. The solvent removed through line 41 is split into two portions, the first of which is passed to the preceding zone 32 through line 42 as described above. The second portion is passed through line 48 to form the first solvent of the second zone 51.

After the protein and solvent from line 48 have mixed, they are introduced into second zone 51 through line 49. The solvent then removes a portion of the soluble material contained in the protein and is separated through separating wall 52 from the protein. This separated solvent is then withdrawn from the zone 51 through line 41 and is split into the two portions as described. Additional solvent from a solvent supply source 56 is introduced into the second zone 51 through line 54 and is mixed with the protein in the zone 51. This second solvent from line 54, since this is the Nth zone, is fresh solvent. After the solvent has solubilized a portion of the soluble material in the protein, it is separated from the protein through separating wall 52 and is withdrawn through line 41. The protein is then withdrawn from the second zone 51 through line 58 and is stored in protein concentrate 60.

Depending upon the particular protein containing material and the solvents employed, various conditions can be adjusted to achieve optimum extraction of the soluble matter from the protein containing material with the use of a minimum amount of solvent. It should be recognized that the recovery of solvent is an expense which should be minimized to improve the economics of the process. While the extraction capabilities of each system will be different, it is possible to adjust the rate of transfer of the protein containing material through the various zones so that maximum recovery of the protein concentrate is achieved. It is possible to adjust the proportion of solvent being recycled in each zone to insure sufficient contact of the solvent and the protein containing material. For example, by way of illustration, it is possible to adjust the flow of the solvent being withdrawn from zone 32 so that ¾ of the solvent being withdrawn passes through pipe 24 for recycle and only ¼ passes through pipe 38 for recovery. Likewise, zone 51 may be adjusted to vary this ratio of solvent being passed through the pipes 42 and 48. Of course, to achieve continuity in operation, it is necessary to insure that the amount of fresh solvent introduced through pipe 54 is approximately equal to the amount of solvent withdrawn through pipe 38. The amount withdrawn through pipe 38 will be slightly less normally than the amount added through pipe 54 because an amount of solvent may be entrained in the substance exiting through line 58.

Thus it can be seen that solvent extraction takes place twice in each zone with the use of the separating walls 52 and 34. The protein containing material is washed or treated with a solvent with successively purer solutions in a direct proportion to the purity of the protein containing material. The pure solvent in pipe 54 contacts the protein concentrate at its purest state while the solvent containing the highest concentration of dissolved material, coming through line 24, passes through the raw protein containing material which contains the highest amount of soluble matter.

Figure 2:
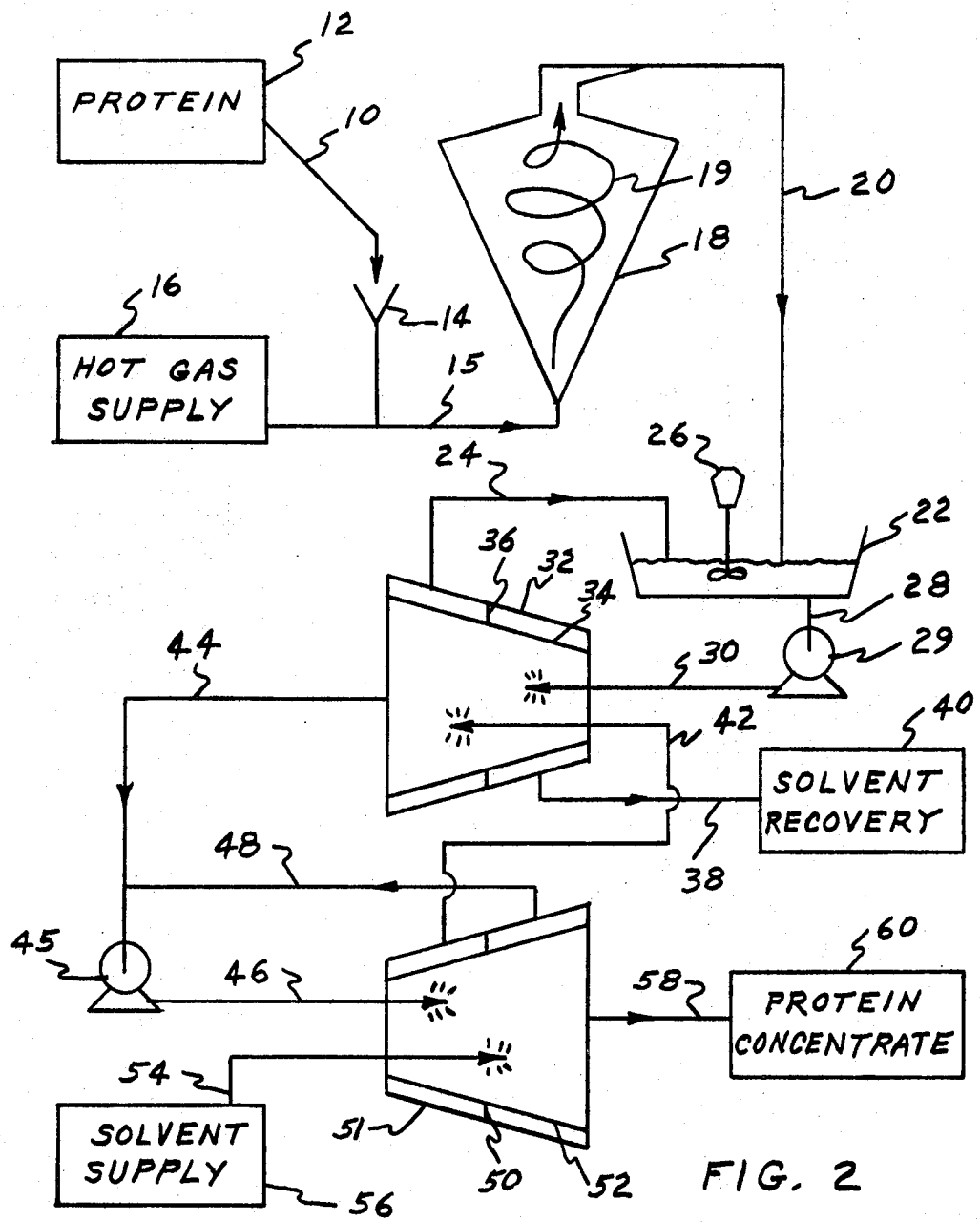
FIG. 2 is a schematic flow diagram demonstrating several preferred embodiments of the present invention.

FIG. 2 represents a flow diagram wherein a pair of two stage centrifuges are employed in the separation of protein by the use of a solvent. In this example, N is 2, thereby defining zones 32 and 51.

Protein contained in protein source or supply 12 is introduced through line 10 into a hopper or funnel-like receiver 14, which in turn deposits the protein into line 15 for contact with hot gas from hot gas supply 16. Passage of the protein in contact with the hot gas through chamber 18 in the direction shown generally by arrow 19 permits a substantial reduction in the volatile material contained therein. The thus partially dried protein is passed through line 20 and to tank 22 where it is mixed with solvent from line 24 by mixer 26. The protein mixed with the first solvent from line 24 is then passed through line 28, pump 29 and is introduced into the first zone 32 through line 30. After intimate contact of the solvent and the protein, the protein is separated from this first solvent through screen 34. The solvent, which is at its most impure state, is withdrawn from the zone 32 through line 38 for recovery in solid recovery device 40. The protein is then passed on further through zone 32 and is contacted with a second solvent from the next succeeding zone 51, which is introduced through 42 into zone 32. After contact of the protein with the solvent, the second solvent is separated from the protein through screen 34 and is passed back to tank 22 through line 24. Retaining wall 36 separates the two collection areas in zone 32.

The protein is then passed through line 44 to the second zone 51. The protein is mixed with a first solvent from line 48, which is being recycled from the second zone 51, through pump 45 and is introduced into the second zone 51 through line 46. The solvent, having extracted a portion of the soluble material contained in the protein, is then separated from the protein through screen 52, and the separated solvent is then withdrawn through line 42 for passage back to the preceding first zone, through line 42, whereby this solvent forms the second solvent of the first zone. Passage of the protein containing material onto the latter part of second zone 51 permits contact of the protein with a second solvent introduced through line 54 from the solvent supply 56. This second solvent supplied through line 54 rushes or extracts a further amount of soluble material from the protein. It is then separated from the protein through screen 52. This separated solvent is passed through line 48 and forms the recycled solvent or first solvent for this second zone 51. The purified protein is then passed through line 58 to a collection point 60.

It can now be seen that the present invention provides a substantial improvement in the efficient use of solvents to extract soluble materials from protein containing materials. The solvent is handled in such a manner as to insure that each succeeding zone of extraction contains solvent of higher purity. More important, the protein containing material being treated in each zone is contacted with solvent of a higher purity than in the preceding zone followed by contact by solvent of even higher purity which was obtained from the next succeeding zone. In this manner, separation of the insoluble protein from the fats, oils, starches, sugars, and other soluble materials may efficiently be achieved without the use of large volumes of solvent or undue delay.

Having thus described the invention, what is claimed is:
 1. A process for removing soluble material from protein containing said material, comprising the steps of: contacting said protein with heated gas for sufficient time to substantially reduce the volatile material therein; and
   introducing said protein into each of the series of N zones, where N is an integer of at least one, with a quantity of first solvent, said first solvent having been recycled from said zone, and separating said protein from said first solvent in said zone;
   followed by mixing said protein with a quantity of second solvent, said second solvent having been obtained from the next succeeding zone, in separating said protein from said second solvent, said second solvent being fresh solvent in the Nth zone.
 2. The process of claim 1 wherein at least 50% of the volatile material is removed.
 3. The process of claim 1 wherein at least 80% of the volatile material is removed.
 4. The process of claim 1 wherein a centrifuge is used to separate said solvent and said soluble material from said protein.
 5. The process of claim 1 wherein said solvent from said next succeeding zone is introduced into said zone at a point near the discharge end of said zone.
 6. The process of claim 1 wherein said recycled portion of said solvent is withdrawn from the discharge end of said zone and is returned to said zone at a point near the entrance of said zone.

7. The process of claim 1 wherein said solvent is withdrawn from a point near the entrance of said zone and is passed back to the next preceding zone, and additional solvent is withdrawn from the second part of said zone and is recycled to a point near the entrance of said zone.

References Cited

UNITED STATES PATENTS

| | | | |
|---|---|---|---|
| 2,297,685 | 10/1942 | Brier et al. | 260—112 |
| 2,445,931 | 7/1948 | Beckel et al. | 260—412.4 |
| 2,559,257 | 7/1951 | Obey | 260—123.5 |
| 2,567,179 | 9/1951 | Bonotto | 260—412.8 |
| 3,076,708 | 2/1963 | Cavanagh | 99—7 |
| 3,099,562 | 7/1963 | Rogers | 99—18 |
| 3,207,744 | 9/1965 | O'Hara et al. | 260—123.5 |
| 3,402,165 | 9/1968 | Bock | 260—123.5 |

WILLIAM H. SHORT, Primary Examiner

H. SCHAIN, Assistant Examiner

U.S. Cl. X.R.

99—14, 17, 18; 260—123.5